July 12, 1960 F. W. CHURCH, JR 2,944,686
SHIELDING DEVICE FOR A DRIVE UNIT
Filed Nov. 10, 1958 2 Sheets-Sheet 1

INVENTOR.
FRANK W. CHURCH, Jr.

BY Andrus + Starke

Attorneys

July 12, 1960  F. W. CHURCH, JR  2,944,686
SHIELDING DEVICE FOR A DRIVE UNIT
Filed Nov. 10, 1958  2 Sheets-Sheet 2

INVENTOR.
FRANK W. CHURCH, Jr.
BY
Attorneys

United States Patent Office 2,944,686
Patented July 12, 1960

2,944,686

SHIELDING DEVICE FOR A DRIVE UNIT

Frank W. Church, Jr., Kankakee, Ill., assignor to A. O. Smith Corporation, Milwaukee, Wis., a corporation of New York Filed Nov. 10, 1958, Ser. No. 773,011

6 Claims. (Cl. 214—17)

This invention relates to a shielding device for a drive unit, and more particularly to a shield for a center drive post of a mechanical unloading unit in a storage structure adapted to contain a free-flowing material.

A sealed storage structure is often employed to store fibrous materials, such as silage or haylage, or free-flowing materials, such as flour, sugar, shelled corn and the like. With a sealed storage structure or silo, a bottom unloading mechanism, such as that disclosed in the patent to Tiedemann 2,635,770, is used to dislodge the stored material and convey the same to the exterior of the silo. In an unloading mechanism of this type, a cutter arm is rotatably secured to a central drive post located at the center of the silo. A cutter chain having a plurality of cutter teeth is mounted on the cutter arm and travels in an endless path around the arm as the arm rotates about the drive post. The teeth cut or dislodge the stored material and convey the same to the center of the silo where the material is deposited within a trough formed in the floor of the silo. A conveyor unit operating within the trough conveys the material from the center of the silo to the exterior.

When free-flowing material, such as shelled corn, is stored in a silo or the like, the material will funnel down toward the center of the silo and fills all cracks and crevices in this area. As the silo may have a height of about 40 feet, the energy of the free-falling material packs the material very tightly around the center post structure and the drive sprocket for the cutter chain. This tight packing of the free-flowing material around the drive post and the sprockets results in a considerable load being placed on the drive mechanism when the unloader is started and, in some cases, prevents the cutter chain and arm from being rotated.

The present invention is directed to a shield or bonnet which is mounted on the upper end of the center drive post and extends radially outward therefrom. The peripheral edge of the shield is secured to the rotating cutter arm so that the shield will be supported and rotates with the cutter arm.

The shield or bonnet prevents the free-flowing material from packing around the drive post or shaft and sprockets carried by the drive shaft. This enables a drive unit of lesser power to be employed for operating the unloader mechanism and prevents overheating of the motor.

Other objects and advantages will appear in the course of the following description.

The drawings illustrate the best mode presently contemplated of carrying out the invention.

Figure 1:
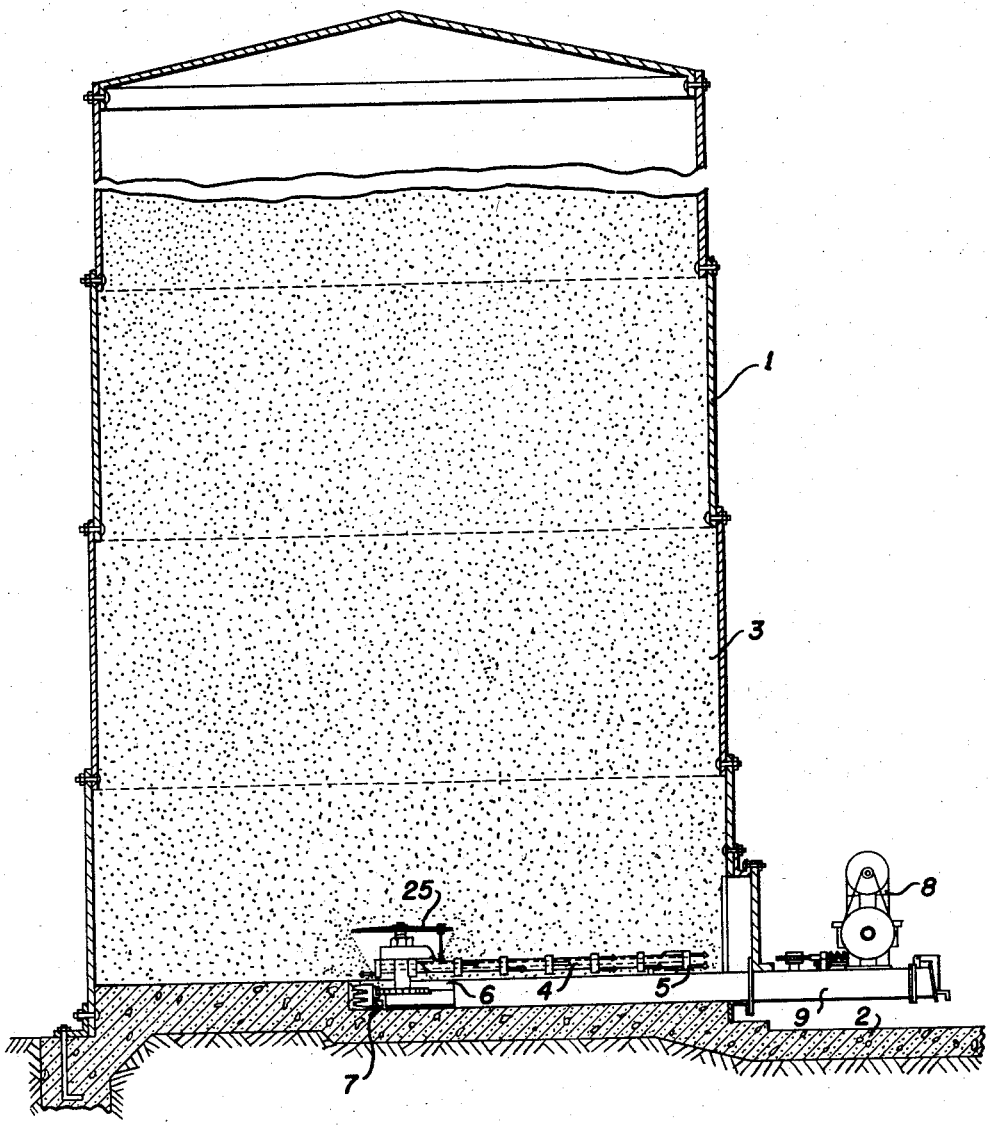
Figure 1 is a vertical section of a silo or storage structure embodying the present invention.
Figure 2:
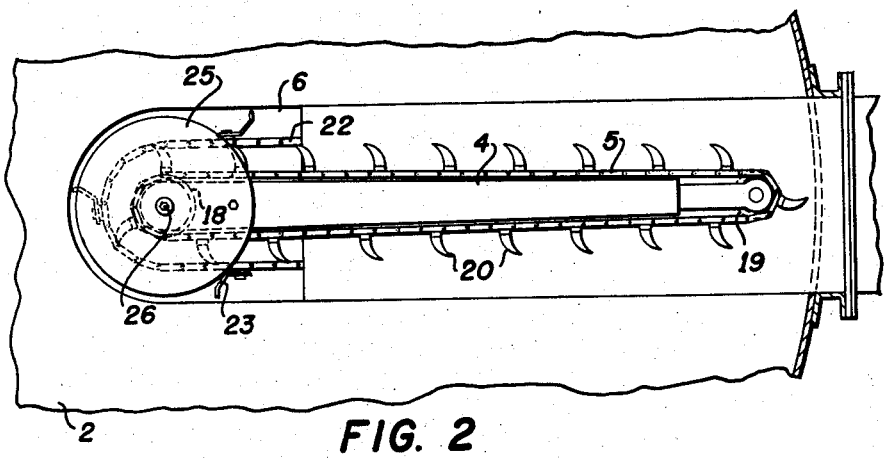
Fig. 2 is a fragmentary enlarged top plan view of the unloader mechanism in the silo.

The drawings illustrate a sealed storage structure or silo 1 which is supported on a foundation 2 and is adapted to contain a free-flowing material 3, such as shelled corn, chopped ear corn, soy meal, sugar, meat scraps, flour or the like.

The free-flowing material is introduced into the sealed storage structure 1 through a suitable inlet in the top of the structure and is removed by means of a mechanical unloading device located at the bottom of the structure. The unloading device comprises a cutter arm 4 which is rotatably secured at the center of the storage structure and carries a cutter chain 5 which travels in an endless path about the cutter arm. The cutter arm is adapted to rotate within the structure and the cutter chain dislodges or cuts the stored material and delivers the same to the center of the structure.

A radially extending trough 6 is formed in the foundation 2 and the stored material is delivered to the central portion of the trough where a conveyor unit 7 conveys the same to the exterior of the silo.

The rotating cutter arm 4, cutter chain 5 and conveyor 7 are driven by a drive unit 8 which is secured to the conveyor housing 9 on the outside of the storage structure 1.

The inner end of the cutter arm 4 is secured to a vertical drive shaft 10 which is located at the center of the storage structure 1 and is journaled within a hub 11 supported on the bottom of trough 6. The lower end of the drive shaft 10 carries a gear 12 which meshes with a pinion 13 on gear 14. Gear 14 engages the bevel gear 15 which is secured to the end of the horizontal drive shaft 16. The drive shaft 16 is driven by a drive unit, similar to that described in the Tiedemann Patent 2,635,770. Rotation of the drive shaft operates through the gears 15, 14, 13 and 12 to drive the shaft 10 and thereby rotate the cutter arm 4 within the storage structure.

A sleeve 17 is journaled on the hub 11 and the sleeve carries a drive sprocket 18 which supports the cutter chain 5. The outer end of the cutter chain is supported by an adjustable idler sprocket 19 secured to cutter arm 4.

The cutter chain 5 is provided with a series of teeth 20 which are secured at spaced locations along the length of the chain and are adapted to dislodge or cut the free-flowing material. As shown in the drawings, some of the teeth 20 extend outwardly in horizontal planes from the chain, while other of the teeth extend upwardly and inwardly over the chain to cut or dislodge the material in these areas.

In addition to the cutter chain drive sprocket 18, the sleeve 17 also carries a sprocket 21 which supports the conveyor chain 22. The conveyor chain is provided with a series of spaced conveyor paddles 23 which are adapted to move the free-flowing material 3 through the trough to the exterior of the storage structure. The conveyor chain 22 is driven by a drive sprocket, not shown, which is located within the housing 9.

As the conveyor chain 22 is driven, the sprocket 21 will rotate and thereby rotate sleeve 17 and chain sprocket 18 to drive the cutter chain 5. The teeth 20 on the cutter chain will dislodge the free-flowing material and move the material to the center of the trough where it falls within the trough and the conveyor paddles 23 then move the material within the trough to the exterior of the silo.

To prevent the free-flowing material, which will funnel down to the center of the trough 6, from being packed around the sleeve 17 and sprocket 18, a hub 24 is threadedly engaged with the upper end of the drive shaft 10 and a shield or bonnet 25 is secured to the hub. To secure the shield 25 to the hub 24, a stud 26 is disposed within a suitable axial opening in the shield and is threaded within an opening in the hub 24. A suitable washer is employed on the top surface of the shield 25.

The shield 25 is generally circular in shape and extends radially outward to a location approximately equal to the edge of the trough 6 and substantially beyond the peripheral edge of the chain sprocket 18. As the shield has a substantial diameter and as the weight of the free-flowing material bears on the shield, the peripheral edge of the shield is connected to the cutter arm by means of a threaded rod 27 which passes through suitable openings in the shield 25 and the cutter arm. The rod is secured within the openings by nuts 29 and 30. The rod 28 and nuts 29 and 30 not only support the shield 25 and prevent the same from tilting due to the weight of the material bearing thereon, but also serve to space the shield above the cutter arm and prevent the upwardly extending teeth 23 from contacting the shield.

As the shield 25 rotates with the cutter arm, no bearing assembly is required for the shield assembly. This substantially reduces the cost of the shielding unit.

Figure 3:
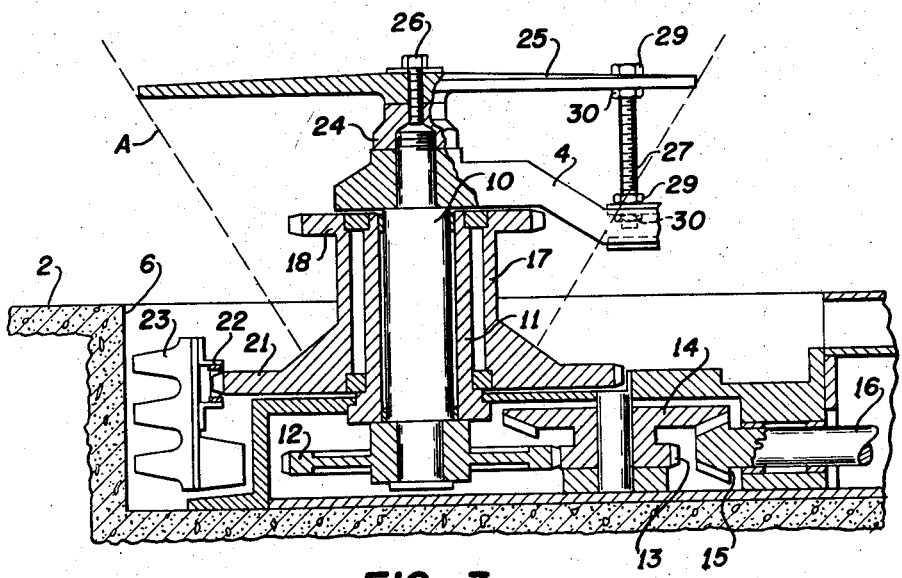
Fig. 3 is a vertical section of the center post drive structure showing the shield attached to the drive post.

The present invention provides a simple and inexpensive structure for preventing free-flowing material in a sealed storage structure from compacting tightly around the central drive mechanism of the unloading unit when the unloading unit is stopped. As shown in Fig. 3, the free-flowing material will fall into the center of the trough after the unloader has stopped until the material reaches its angle of repose, indicated by A in Fig. 3. When this angle has been reached, the flow of the material into the trough will stop. It can be seen from Fig. 3 that when the angle of repose is reached when using the shield 25, the material will not be in engagement with the drive sprocket 18 or the hub portion of the cutter arm which is attached to the drive shaft 10. Thus, the cutter arm and the cutter chain can be started up more easily and this materially decreases the power requirements for the drive unit.

Various modes of carrying out the invention are contemplated as being within the scope of the following claims particularly pointing out and distinctly claiming the subject matter which is regarded as the invention.

I claim:

1. In a storage structure containing a free-flowing material and having an unloading mechanism disposed in the lower end thereof to deliver the material to the exterior of the structure, a post extending upwardly within the storage structure, cutter means mounted on the post and disposed to rotate within the storage structure to dislodge the free-flowing material, a shield mounted on the upper end of the post and extending radially therefrom throughout the entire circumference of the post, and means for supporting the peripheral edge portion of the shield to prevent deflection and bending of the shield due to the weight of the free-flowing material bearing thereon, said shield serving to prevent the free-flowing material from packing tightly around the post and thereby facilitating operation of said cutter means.

2. In a storage structure adapted to contain a free-flowing material and having an unloading mechanism disposed in the lower end thereof to deliver the material to the exterior of the storage structure, a rotatable drive shaft extending upwardly within the structure from the floor thereof, a cutter member mounted on the shaft and disposed to rotate within the storage structure and dislodge the material, a shield mounted coaxially on the upper end of the drive shaft and rotatable therewith and having a substantially greater diameter than the diameter of the shaft whereby the shield projects radially beyond the shaft throughout the entire circumference of said shaft, and means secured to the peripheral edge portion of the shield for supporting said shield and for rotating the shield in accordance with rotation of the drive shaft, said shield serving to prevent the free-flowing material from packing around the drive shaft and facilitating operation of the cutter member.

3. In a sealed storage structure containing a free-flowing material and having an unloading mechanism disposed in the lower end thereof to deliver the material to the exterior of the structure, a rotatable drive shaft extending vertically within the structure, a cutter arm mounted on the shaft and disposed to rotate within the storage structure as the shaft is rotated, an endless member carried by the cutter arm and having a series of dislodging members located at spaced intervals thereon, a drive member connected to the endless member and journaled about said shaft and driven independently of said shaft, said drive member serving to drive said endless member about the cutter arm as said cutter arm is rotated within the storage structure, a shield mounted on the upper end of the drive shaft and rotatable therewith and extending radially therefrom beyond the periphery of said drive member, and means for connecting the peripheral edge portion of said shield to the cutter arm, said shield serving to prevent the free-flowing material from packing around said drive shaft and around said drive member and thereby facilitating the operation of said unloading mechanism.

4. In a sealed storage structure containing a free-flowing material and having an unloading mechanism disposed in the lower end thereof to deliver the free-flowing material to the exterior of the structure, a drive shaft extending vertically within the structure, a cutter arm mounted on said shaft and disposed to rotate within the storage structure as the shaft is rotated, an endless chain carried by the cutter arm and having a series of teeth located at spaced intervals thereon, a drive sprocket connected to the chain and journaled on said shaft, said drive sprocket disposed immediately below said cutter arm and adapted to drive the cutter chain in an endless path as the cutter arm is rotated within the storage structure, a bonnet secured on the upper end of the shaft and rotatable therewith and extending radially therefrom with said bonnet having a substantially greater radius than the radius of said drive sprocket, and a connecting member connecting the peripheral edge portion of the bonnet to the cutter arm to prevent deflection of the bonnet due to the weight of the material bearing thereon, said bonnet serving to prevent the free-flowing material from packing around the drive shaft and said drive sprocket and thereby facilitating operation of said unloading mechanism.

5. In a sealed storage structure containing a free-flowing material and having an unloading mechanism disposed within a radially extending trough formed in the floor of said storage structure, a vertical drive shaft disposed within the trough at the center of the storage structure and extending upwardly out of said trough, a cutter arm secured to the upper end portion of said shaft and disposed to rotate about the floor of said storage structure as the shaft is rotated, a cutter chain mounted on the cutter arm and having a series of teeth located at spaced intervals thereon, a drive sprocket connected to the cutter chain and journaled on said shaft, said drive sprocket adapted to drive the cutter chain in an endless path about the cutter arm as the cutter arm is rotated within the storage structure to thereby dislodge the free-flowing material and convey the same to the center of the silo and into said trough, a hub secured to the upper end of the drive shaft, a generally circular disc secured to the hub and extending radially outward beyond the periphery of said drive sprocket, and a connecting member interconnecting the peripheral edge portion of the disc and the cutter arm and serving to support said shield and space the same above the cutter arm, said disc serving to prevent the free-flowing material from packing around the drive shaft and around said drive sprocket and thereby facilitating the operation of said unloading mechanism.

6. In a sealed storage structure containing a free-flowing material and having an unloading mechanism disposed within a radially extending trough formed in the floor of said storage structure, a vertical drive shaft disposed within the trough at the center of the storage structure and extending upwardly out of said trough, a cutter arm secured to the upper end portion of said shaft and disposed to rotate about the floor of said storage structure as the shaft is rotated, a chain mounted for endless travel on said cutter arm, a series of teeth secured to the chain at spaced locations thereon with at least some of the teeth extending upwardly above said cutter arm, a drive sprocket connected to the cutter chain and journaled on said shaft, said drive sprocket adapted to drive the cutter chain in an endless path about the cutter arm as the cutter arm is rotated within the storage structure to thereby dislodge the free-flowing material and convey the same to the center of the silo and into said trough, a shield mounted on the upper end portion of said drive shaft and extending radially outward beyond the periphery of said drive sprocket throughout the entire circumference of the drive sprocket, and a connecting member interconnecting the peripheral edge portion of the shield and the cutter arm and serving to support said shield and space the same above the cutter arm and thereby prevent contact between said upwardly extending teeth and said shield, said shield serving to prevent the free-flowing material from packing around the drive shaft and around said drive sprocket and thereby facilitating the operation of said unloading mechanism.

References Cited in the file of this patent

UNITED STATES PATENTS

| | | |
|---|---|---|
| 2,336,181 | Lower | Dec. 7, 1943 |
| 2,635,770 | Tiedemann | Apr. 21, 1953 |